(12) United States Patent
Miller

(10) Patent No.: US 9,611,618 B2
(45) Date of Patent: Apr. 4, 2017

(54) DUAL ACTION GRAPPLE APPARATUS

(71) Applicant: Timothy D. Miller, Sioux Falls, SD (US)

(72) Inventor: Timothy D. Miller, Sioux Falls, SD (US)

(*) Notice: Subject to any disclaimer, the term of this patent is extended or adjusted under 35 U.S.C. 154(b) by 204 days.

(21) Appl. No.: 14/718,605

(22) Filed: May 21, 2015

(65) Prior Publication Data

US 2016/0340862 A1 Nov. 24, 2016

(51) Int. Cl.
*E02F 3/28* (2006.01)
*A01B 43/00* (2006.01)
*E02F 3/40* (2006.01)
*E02F 3/413* (2006.01)
*E02F 9/22* (2006.01)

(52) U.S. Cl.
CPC .............. *E02F 3/404* (2013.01); *A01B 43/00* (2013.01); *E02F 3/413* (2013.01); *E02F 9/2203* (2013.01); *E02F 9/2271* (2013.01)

(58) Field of Classification Search
CPC ..... E02F 3/404; E02F 3/96; E02F 3/00; E02F 3/413; E02F 9/2203; E02F 9/2221; A01B 43/00
USPC ......................................................... 37/406
See application file for complete search history.

(56) References Cited

U.S. PATENT DOCUMENTS

| 3,559,314 | A | * | 2/1971 | Funk | E02F 3/815 |
| | | | | | 37/406 |
| 4,607,441 | A | * | 8/1986 | Norton | A01B 43/00 |
| | | | | | 172/247 |
| 7,241,101 | B2 | * | 7/2007 | Bauer | A01F 25/2027 |
| | | | | | 414/726 |
| 8,615,907 | B2 | | 12/2013 | Miller | |
| 2016/0281322 | A1 | * | 9/2016 | Burenga | E02F 3/404 |

FOREIGN PATENT DOCUMENTS

FR 2794932 A1 * 12/2000 ........... A01B 15/025

* cited by examiner

*Primary Examiner* — John G Weiss
(74) *Attorney, Agent, or Firm* — Jeffrey A. Proehl; Woods, Fuller, Shultz & Smith, P.C.

(57) ABSTRACT

A grapple apparatus may comprise at least one grapple arm movable between an open and a closed position, and having a proximal arm portion and a distal arm portion. The apparatus may include a primary actuator having extended and retracted conditions to move the proximal arm portion, and a secondary actuator having extended and retracted conditions to move the distal arm portion. The primary actuator may be configured such that an initial rate of movement of the primary actuator from the extended condition toward the retracted condition is slower than an initial rate of movement of the secondary actuator from the extended condition toward the retracted condition to produce substantially complete movement of the distal arm portion of the at least one grapple arm toward the open position before movement of the proximal arm portion toward the open position is initiated.

19 Claims, 19 Drawing Sheets

MINIMAL CLOSING GAP

MODERATE OPENING

EXCESSIVE OVERHANG

EXCESSIVE CLOSING GAP

MODERATE OVERHANG

WIDE OPENING

DUAL ACTION GRAPPLE APPARATUS

BACKGROUND

Field

The present disclosure relates to grapple apparatus and more particularly pertains to a new dual action grapple apparatus providing substantially sequential movement of portions of the grapple arm for more effective grasping of objects.

Description of the Prior Art

In the design of grapple apparatus for buckets or other implements, it is generally desirable to maximize three characteristics. The first characteristic is to achieve a relatively small closing gap between the tips of the grapple teeth and the bucket when the grapple is in the closed position to help hold the grasped contents in the bucket. The second characteristic is to achieve a relatively large opening when the grapple is in the open condition to permit the grapple to grasp large objects or handle large amounts of material. The third characteristic is to achieve minimal "overhang" of the grapple when the grapple is in the open position, which is the distance that the tips of the grapple teeth are forward of the bucket when the bucket is flat on the ground surface. More specifically, relatively minimal overhang means that the grapple vehicle operator can drive up to tall piles of material (such as bunkers of silage) and begin to manipulate the material with the edge of the bucket before the open grapple interferes (by contact) with the material.

However, known grapple designs tend to have to compromise on one or more of these three basic characteristics to maximize the remaining characteristic(s), and usually focus on minimizing the closing gap. The typical grapple with a single cylinder rotating the grapple simply can't do well at all three characteristics with a bucket of typical size.

For example, the design shown in FIGS. 17A and 17B is highly popular because it has a minimal closing gap and moderate degree of opening distance in the open position, but it also suffers from excessive overhang when in the open position. As another example, the design shown in FIGS. 17C and 17D has a relatively wide opening in the open condition with only moderate overhang, but the closing gap is large.

U.S. Pat. No. 8,615,907 presents one approach to maximizing these three characteristics and uses a mechanical "lock" provided by a guide arm, and works well in many situations. However, there are situations where a particularly large object or a sufficiently large amount of material will prevent the grapple from rotating from the open positon toward the closed position (see FIG. 18). If the guide pin is still engaged with the guide arm when the grapple contacts the large object, the pivot link can't rotate to the closed position and this may result in a severe bending stress on the guide arm and a severe side load on the cylinder rod. Another drawback of the mechanical lock system of U.S. Pat. No. 8,615,907 is mechanical wear. The guide arm and guide pin contact and rub every time the grapple opens and closes. These elements are both wear parts and need to be periodically replaced. Finally, the mechanical lock system cannot be effectively scaled up to work with a large grapple, as the size of the guide arm would be highly impractical.

SUMMARY

In one aspect, the present disclosure relates to a grapple apparatus for an implement which may comprise at least one grapple arm movable between an open position and a closed position, with the at least one grapple arm comprising a proximal arm portion for movably mounting on the implement and a distal arm portion movably mounted on the proximal arm portion. The apparatus may include a plurality of grapple teeth being mounted on the at least one grapple arm and a primary actuator connected to the proximal arm portion to move the proximal arm portion, with the primary actuator being extendable into an extended condition to move the proximal arm portion of the at least one grapple arm toward the closed position and being retractable into a retracted condition to move the proximal arm portion toward the open position. The apparatus may also include a secondary actuator connected to the distal arm portion to move the distal arm portion, with the secondary actuator being extendable into an extended condition to move the distal arm portion of the at least one grapple arm toward the closed position and being retractable into a retracted condition to move the distal arm portion toward the open position. The primary actuator may be configured such that an initial rate of movement of the primary actuator from the extended condition toward the retracted condition is slower than an initial rate of movement of the secondary actuator from the extended condition toward the retracted condition to produce substantially complete movement of the distal arm portion of the at least one grapple arm toward the open position before movement of the proximal arm portion toward the open position is initiated.

In another aspect, the present disclosure relates to a grapple apparatus for an implement which may comprise at least one grapple arm movable between an open position and a closed position, with the at least one grapple arm comprising a proximal arm portion for movably mounting on the implement and a distal arm portion movably mounted on the proximal arm portion. The apparatus may include a plurality of grapple teeth being mounted on the at least one grapple arm and a primary actuator connected to the proximal arm portion to move the proximal arm portion, with the primary actuator being extendable into an extended condition to move the proximal arm portion of the at least one grapple arm toward the closed position and being retractable into a retracted condition to move the proximal arm portion toward the open position. The apparatus may also include a secondary actuator connected to the distal arm portion to move the distal arm portion, with the secondary actuator being extendable into an extended condition to move the distal arm portion of the at least one grapple arm toward the closed position and being retractable into a retracted condition to move the distal arm portion toward the open position. The primary actuator may be configured such that an initial rate of movement of the primary actuator from the extended condition toward the retracted condition is slower than an intermediate rate of movement of the primary actuator toward the retracted condition. In some embodiments, the initial and intermediate rates of movement may be the only movement rates for the actuator or actuators, while in other embodiments additional rates of movement may be utilized during the movement from retracted to extended and/or extended to retracted.

In still another aspect, the disclosure relates to a loader system comprising a mobile frame, at least one lift arm pivotable with respect to the mobile frame by at least one actuator, an implement mounted on the at least one lift arm, and a grapple mount structure mounted on the implement. The system may also include a grapple apparatus comprising at least one grapple arm movable between an open position and a closed position, with the at least one grapple arm comprising a proximal arm portion movably mounted on the implement and a distal arm portion movably mounted on the proximal arm portion. The apparatus may include a plurality of grapple teeth being mounted on the at least one grapple arm and a primary actuator connected to the proximal arm portion to move the proximal arm portion, with the primary actuator being extendable into an extended condition to move the proximal arm portion of the at least one grapple arm toward the closed position and being retractable into a retracted condition to move the proximal arm portion toward the open position. The apparatus may also include a secondary actuator connected to the distal arm portion to move the distal arm portion, with the secondary actuator being extendable into an extended condition to move the distal arm portion of the at least one grapple arm toward the closed position and being retractable into a retracted condition to move the distal arm portion toward the open position. The primary actuator may be configured such that an initial rate of movement of the primary actuator from the extended condition toward the retracted condition is slower than an initial rate of movement of the secondary actuator from the extended condition toward the retracted condition to produce substantially complete movement of the distal arm portion of the at least one grapple arm toward the open position before movement of the proximal arm portion toward the open position is initiated.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
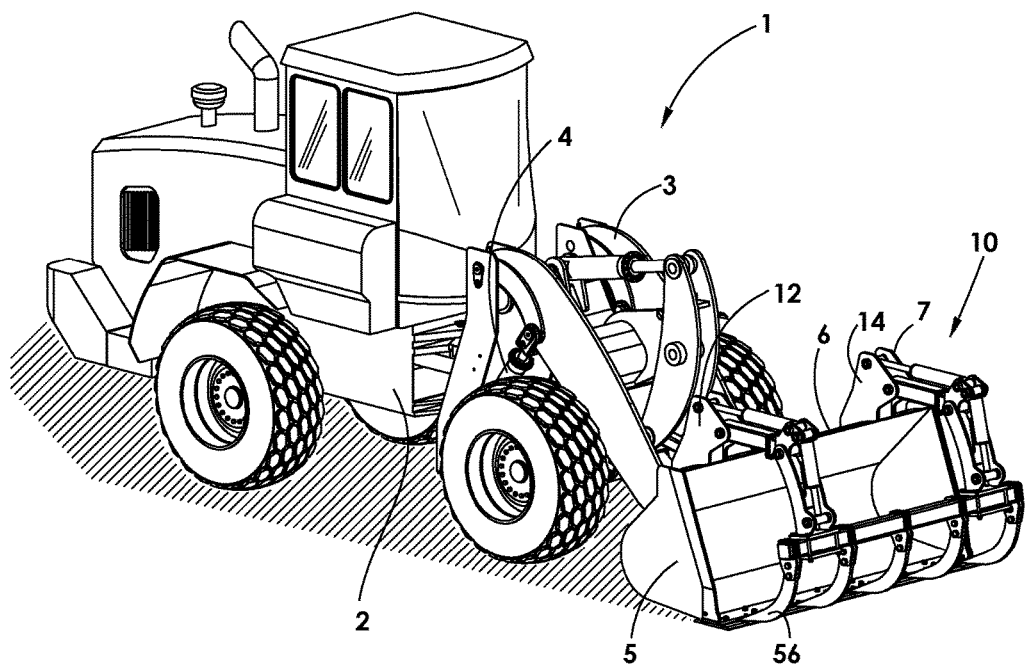
FIG. 1A is a schematic right front perspective view showing an articulated wheel loader with a bucket and an embodiment of the grapple attachment according to the present disclosure.
Figure 1B:
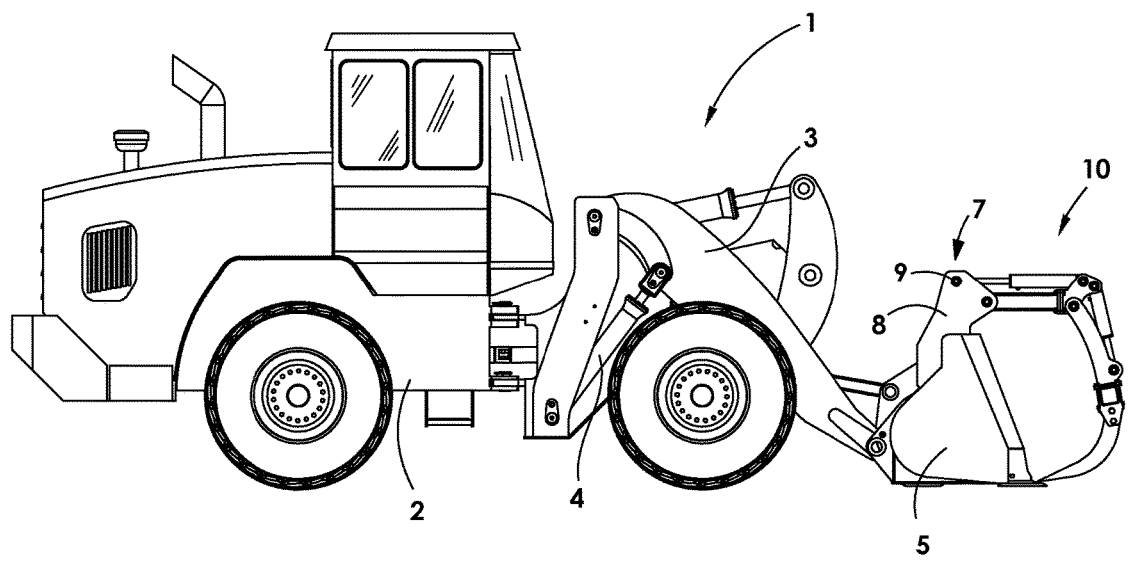
FIG. 1B is a schematic right side view of the loader and bucket with grapple attachment shown in FIG. 1A.
Figure 2A:
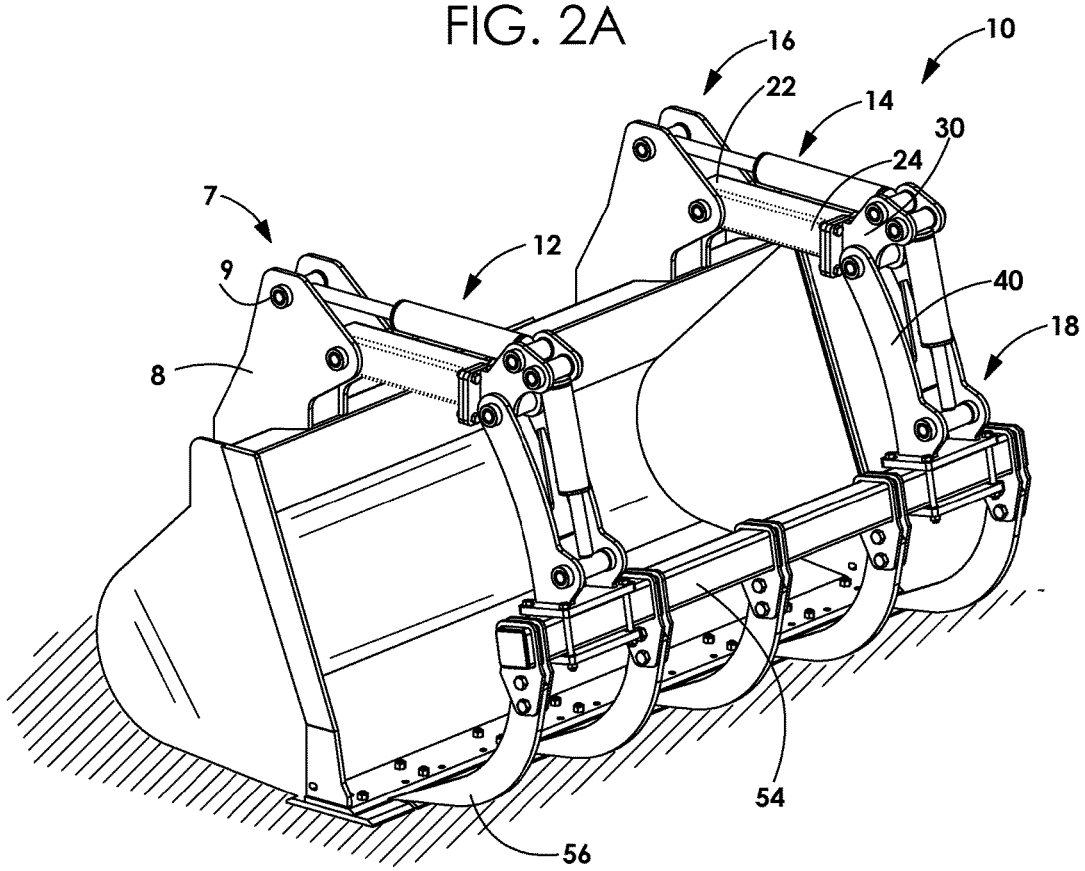
FIG. 2A is a schematic front perspective view of the bucket and an embodiment of the grapple attachment according to the present disclosure shown in a closed position and being isolated from the wheel loader.
Figure 2B:
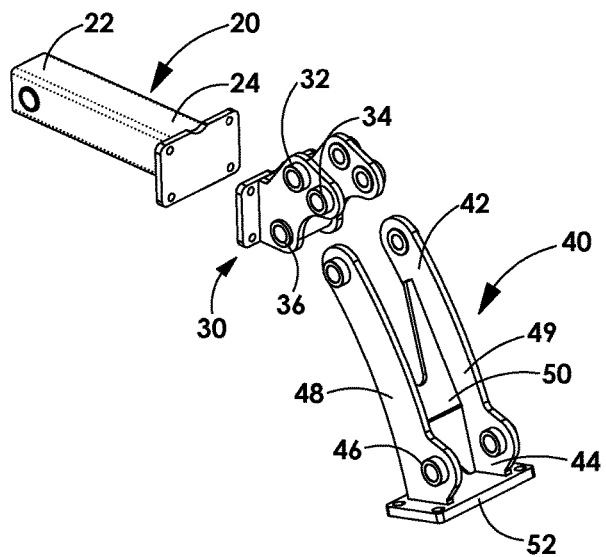
FIG. 2B is a schematic front perspective view of elements of an embodiment of a grapple arm of the grapple attachment according to the present disclosure.
Figure 3:
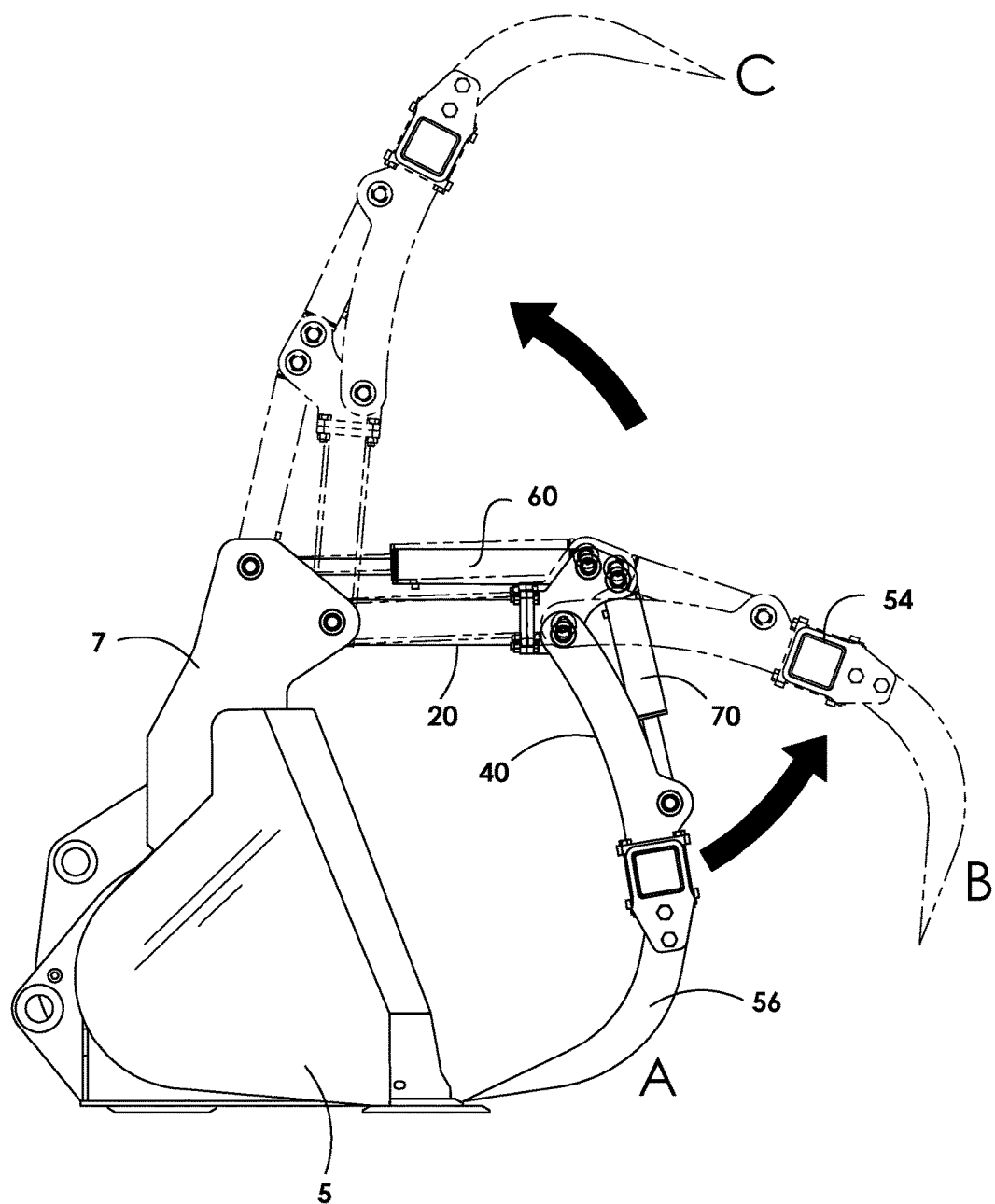
FIG. 3 is a schematic side view of the bucket and an embodiment of the grapple attachment shown moving from a closed position to an open position.
Figure 4:
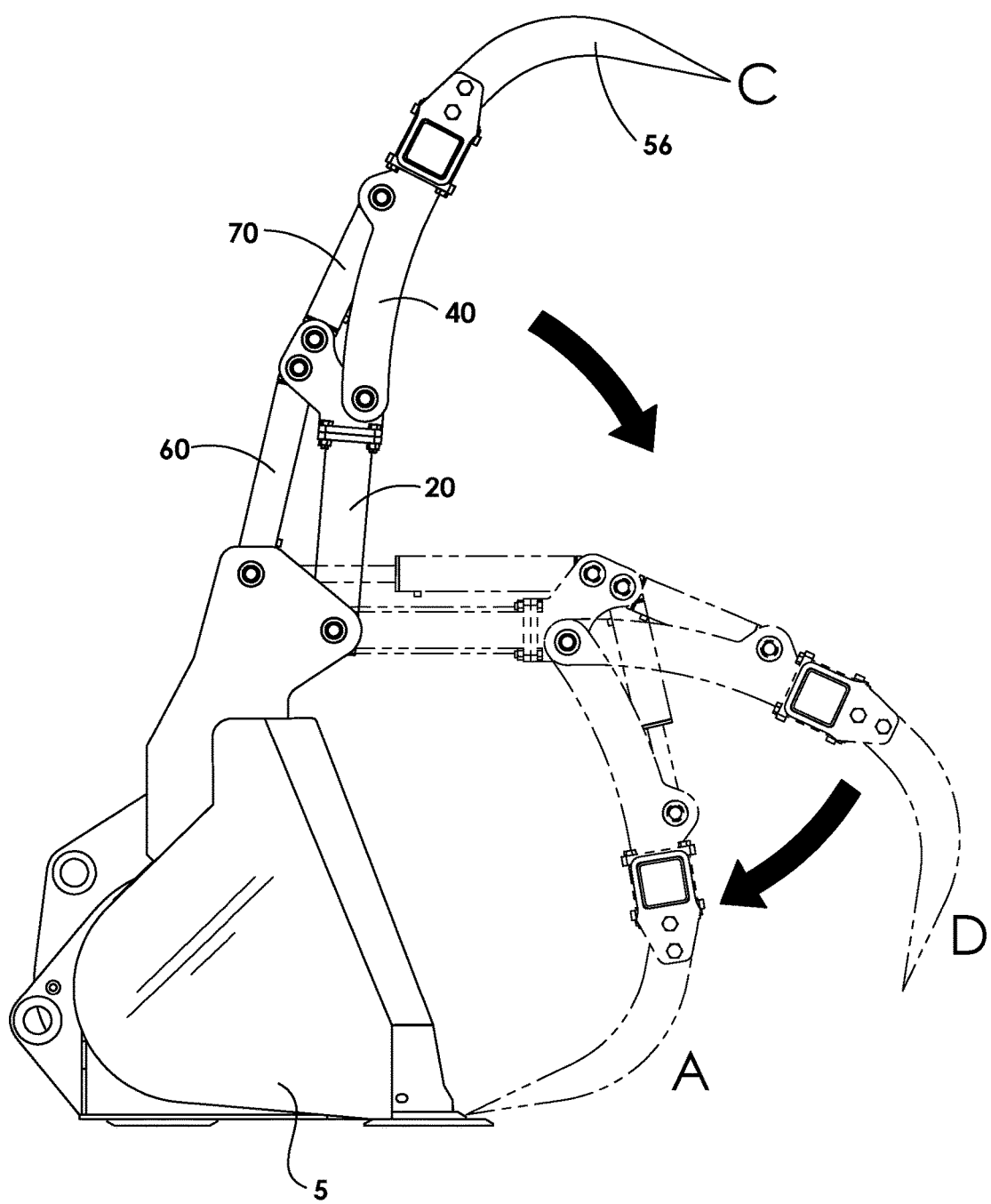
FIG. 4 is a schematic side view of the bucket and an embodiment of the grapple attachment shown moving from an open position to a closed position.

With reference now to the drawings, and in particular to FIGS. 1 through 18 thereof, a new dual action grapple apparatus embodying the principles and concepts of the disclosed subject matter will be described.

Applicant has also recognized that in conventional grapple designs, the available clamping force is maximized when the clamp is near the center of its rotation, but is significantly less when the clamp is rotated to positions near the open position or the closed position. Additionally, the heretofore known grapple designs that have been optimized for grasping and handling large objects have also been greatly compromised in the way that those grapples have been able to handle relatively small objects and in the ability to exert high clamping power. Conversely, heretofore known grapple designs that have been optimized for handling small objects with great clamping power have been compromised in the grapple's ability to grab relatively large objects.

The applicant has developed features for a grapple system with an apparatus similar in relative size to existing designs but is more versatile in handling objects of varying sizes, and opens and closes in a manner that permits higher grabbing power throughout the complete rotation of the grapple clamp Further, the applicant has developed features for grapple apparatus design that maximize the three key characteristics by utilizing a two arm portion structure for the grapple that employs two actuators (e.g., hydraulic cylinders) for moving the arm portions of the bifurcated structure that may preferably operate substantially sequentially such that each of the actuators may be primarily responsible for a portion of the grapple's rotation.

In one aspect, the disclosure relates to a loader 1 having forward and rearward movement directions. The loader may include a mobile frame 2, which may include axles and wheels mounted on the axles which are in turn mounted on frame members forming a portion of the frame 2. The loader may also include at least one lift arm 3 which is generally pivotable with respect to the mobile frame by at least one actuator 4. Commonly, although not necessarily, the loader will include a pair of lift arms moved by one or more actuators 4. The loader may also include a bucket 5 which is pivotally mounted on the lift arm or arms 3, and the bucket may have an upper wall 6, a lower wall extending to the upper wall, and end walls extending from the upper and lower walls and closing the ends of the bucket.

The loader may also include a grapple mount structure 7 which is mounted on the bucket. Typically, the grapple mount structure is located on the upper wall 6 of the bucket. While the configuration of the grapple mount structure may vary, illustratively the structure 7 includes a pair of grapple mount structures which are laterally spaced along the upper wall of the bucket, and each of the grapple mount structures may comprise a pair of spaced mount plates and may include a pair of mount holes 9. The mount holes in one of the plates may be axially aligned with the mount holes of the other mount plate of a particular grapple mount structure 7.

In other aspects, the disclosure relates to a grapple 10 either alone or in combination with elements of the loader 1. The grapple 10 may be mounted on the grapple mount structure 7 and may be movable between a closed position (e.g., see FIG. 3) and an open position (e.g., see FIG. 4). The open position of the grapple may be characterized by the grapple being open to receive objects into the bucket without significant interference by the grapple. The closed position of the grapple may be characterized by the grapple bucket being closed upon objects in the bucket thereby preventing or resisting movement of objects in the bucket out of the bucket. The grapple 10 may include at least one grapple arm 12, and typically although not necessarily includes a pair of grapple arms 12, 14. Each of the grapple arms may include a proximal end 16 located relatively closer to the mobile frame of the loader, and a distal end 18 located relatively further away from the mobile frame than the proximal end.

Each of the grapple arms 12, 14 may include a proximal end portion 20 which may be movably mounted on the grapple mount structure 7. The proximal end portion may be pivotally mounted on the mount structure 7, and may have an inner end 22 and an outer end 24. The inner end 22 may be positioned between the mount plates 8 of the mount structure 7, and may be pivotally mounted on the mount structure. Illustratively, the inner end 22 may be mounted on the mount plates by a pin passing through the inner end of the proximal arm portion and a pair of the first mount holes 9 located in the mount plates.

Each of the grapple arms may also include a pivot block 30 mounted on the outer end 24 of the proximal arm portion 20, and may be immovably mounted on the outer end of the proximal end portion. The pivot block 30 may include a primary actuator mount structure 32, a secondary actuator mount structure 34, and an arm mount structure 36.

Each of the grapple arms may also include a distal arm portion 40 which may be movable with respect to the proximal end portion 20, and illustratively may be pivotable with respect to the proximal arm portion. The distal arm portion 40 may be mounted on the pivot block 30, and may be mounted on the arm mount structure 36 of the pivot block. The distal arm portion 40 may have an inward end 42 and an outward end 44, and may also include a third actuator mount structure 46 which may be located on the distal arm portion toward the outward end 44.

Illustratively, the distal arm portion may include a pair of laterally spaced arm plates 48, 49 which may extend from the inward end 42 toward the outward end 44. The third actuator mount structure 46 may be formed by an ear on each of the plates 48, 49. The distal arm portion 40 may also include a connector plate 50 extending between the arm plates and being connected to the arm plates to thereby connect the arm plates together. The distal arm portion may also include an end plate 52 which is positioned towards the outward end 44 of the arm portion. The end plate 52 may be connected to the arm plates 48, 49 and may extend transversely with respect to the arm plates.

The grapple 10 may also include a connector bar 54 which connects the grapple arms 12, 14 together to facilitate consistent movement of the arms. The connector bar 54 may extend laterally between the grapple arms and may be connected to the distal arm portions 40 of the respective arms. The connector bar may be positioned at the outward ends 44 of the distal arm portions, and may be fastened to the end plates 52 of the respective grapple arms. A plurality of grapple teeth 56 may be mounted on the grapple arms, and in those embodiments employing the connector bar 54, the teeth 56 may be mounted on the connector bar.

The grapple 10 may also include a primary actuator 60 and a secondary actuator 70 employed to move elements of the grapple 10 as the grapple moves between the opened and closed positions. The primary actuator 60 may be positioned adjacent to the proximal arm portion and may be extendable and retractable such that a first end 62 and a second end 63 of the actuator 60 are movable relatively closer to each other and relatively away from each other. The first end 62 of the primary actuator may be mounted on the grapple mount structure 7, and more specifically may be connected by a pin to one of the mount holes 9 of the mount plates 8. The second end 63 of the primary actuator 60 may be mounted on the pivot block 30, and may be mounted on the primary actuator mount structure 32. The primary actuator 60 may be extended into an extended condition generally corresponding to the closed position of the grapple, and may also be retracted into a retracted condition generally corresponding to the open position of the grapple.

The secondary actuator 70 may be positioned adjacent to the distal arm portion 40 of a grapple arm, and may also be generally extendable and retractable to move the first end 72 and second end 73 of the secondary actuator 70 relatively away from and relatively closer to each other. The first end 72 of the secondary actuator may be mounted on the pivot block, and more specifically may be mounted on the secondary actuator mount structure 34 of the pivot block. The second end of the secondary actuator may be mounted on the distal arm portion 40, and may be mounted at a location toward the outward end 44 of the distal arm portion. In some embodiments, the second end may be mounted on the third actuator mount structure 46 located on the distal arm portion. The second actuator may be moved between an extended and a retracted condition, with the extended condition generally corresponding to the closed position of the grapple, and the retracted condition generally corresponding to the open position of the grapple.

The primary actuator may be configured such that an initial rate of movement of the primary actuator from the extended condition toward the retracted condition is slower than an intermediate rate of movement of the primary actuator toward the retracted condition. Also, a final rate of movement of the primary actuator toward the retracted condition may be slower than the intermediate rate of movement and faster than the initial rate of movement.

The primary actuator may also be configured such that an initial rate of movement of the primary actuator from the retracted condition toward the extended condition may be substantially equal to an intermediate rate of movement of the primary actuator toward the extended condition. Also, a final rate of movement of the primary actuator toward the extended condition may be slower than the intermediate rate of movement.

The secondary actuator may be configured such that an initial rate of movement of the secondary actuator from the retracted condition toward the extended condition may be slower than an intermediate rate of movement of the secondary actuator toward the extended condition. Also, a final rate of movement of the secondary actuator toward the extended condition may be slower than the intermediate rate of movement and faster than the initial rate of movement.

The secondary actuator may also be configured such that an initial rate of movement of the secondary actuator moving toward the retracted condition is substantially equal to an intermediate rate of movement of the secondary actuator toward the retracted condition. Also, a final rate of movement of the primary actuator toward the retracted condition may be slower than the intermediate rate of movement.

Systems in which the primary and secondary actuators move at some or all of the relative rates set forth above between extended and retracted conditions may be beneficially used to cause the substantially sequential movement of the actuators such that when the grapple is to move to the open position from the closed position, the secondary actuator initially retracts at a relatively faster rate than the primary actuator. The secondary actuator may thus substantially fully retract before the primary actuator has initially begun to retract, and causes a sequence in which the secondary actuator retracts before the primary actuator extends. In moving the grapple from the closed position to the open position, the sequential actuation of the primary and secondary actuators would cause the secondary actuator to complete the rotation of the distal arm portion before the primary actuator rotates the proximal arm portion to any significant degree. Conversely, when the grapple is to move to the closed position from the open position, the primary actuator initially extends at a relatively faster rate than the secondary actuator. The primary actuator may thus substantially fully extend before the secondary actuator has initially begun to extend, and causes a sequence in which the primary actuator extends before the second actuator extends.

Highly advantageous embodiments of the disclosure achieve different rates of actuator movement between extended and retracted conditions using passive features such as hydraulic pathway structures of the actuator rather than active control of valve movement to regulate the flow of fluid to and from the actuators. While variable actuation of hydraulic supply valves may produce a similar result by controlling the rate at which hydraulic fluid is supplied to the individual actuators at different times, such approaches would most likely require separate supply circuits and valves for each of the primary and secondary actuators rather than a common flow to both the primary and secondary actuators.

Illustratively, embodiments of the system employ hydraulic actuators that include check valves and orifices to control the rate of movement of the piston, and thus the rod, of the actuator in the corresponding cylinder.

Structures such as check valves and orifices have been used in actuator pistons to slow movement of the rod and piston toward the end of the "stroke" of the actuator to minimize jarring of the actuator at the end of the stroke. In contrast, the structures of the present disclosure are configured to slow movement of the piston and rod at the beginning of the stroke of the actuator, and are utilized for different extension and retraction movement on the primary and secondary actuators, to create the substantially sequential movement of the actuators.

In general, the primary actuator 60 may have a primary cylinder 64, a primary piston 66 movable in the cylinder 64, and a primary rod 68 connected to and movable with the piston 66. The primary cylinder 64 may have a primary mount end 67 and a primary rod end 69 through which the rod 68 extends such that the piston 66 is able to move between the mount end 67 and the rod end 69. The secondary actuator 70 may have a secondary cylinder 74, a secondary piston 76 movable in the cylinder 74, and a secondary rod 78 connected to and movable with the piston 76. The secondary cylinder 74 may have a secondary mount end 77 and a secondary rod end 79 through which the rod 78 extends such that the piston 76 is able to move between the mount end 77 and the rod end 79.

Figure 5:
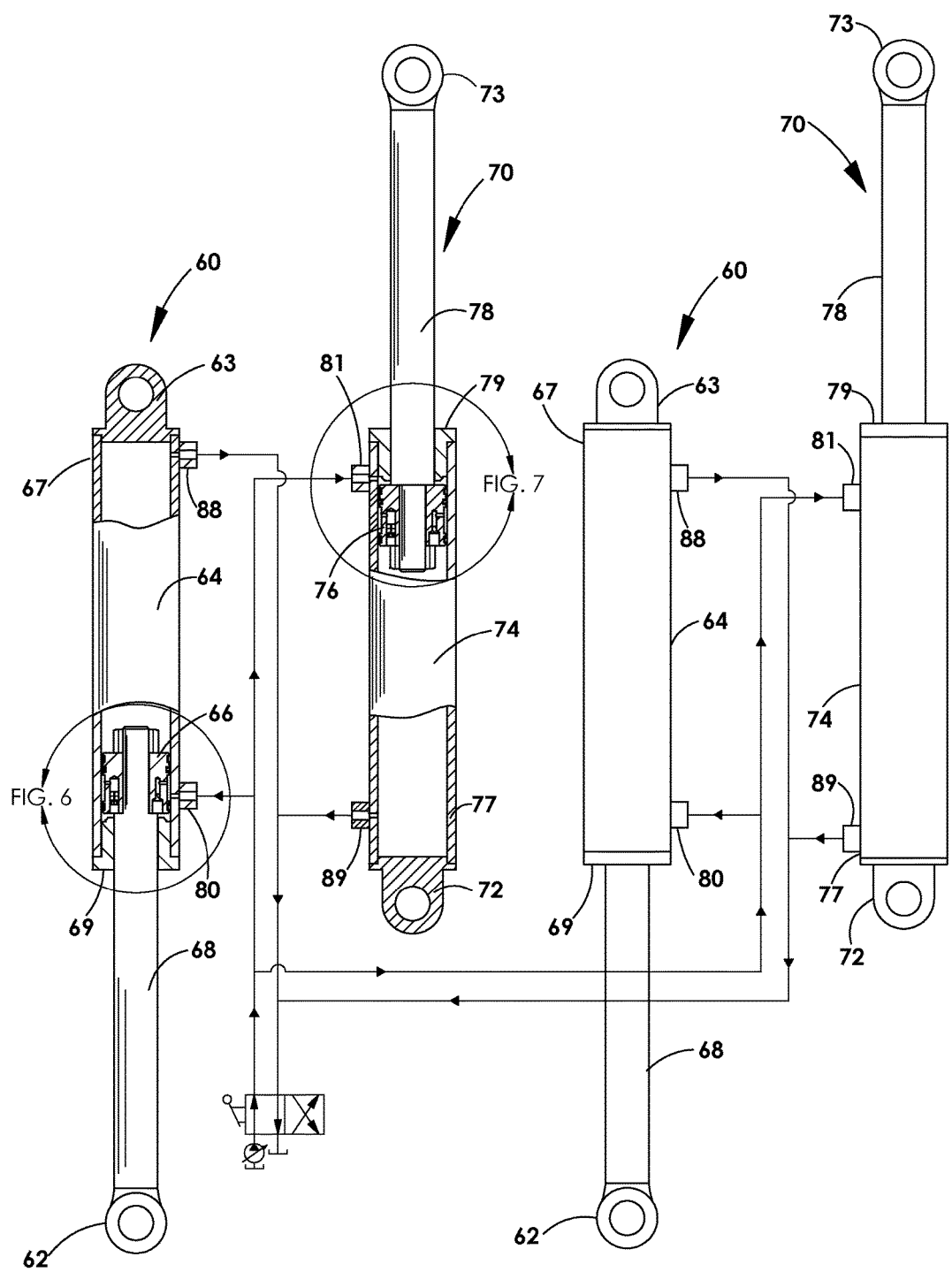
FIG. 5 is a hydraulic schematic showing a pair of the primary actuators and a pair of the secondary actuators in extended conditions generally corresponding to the grapple arms being in the closed position with portions of the actuators removed to reveal detail.
Figure 6:
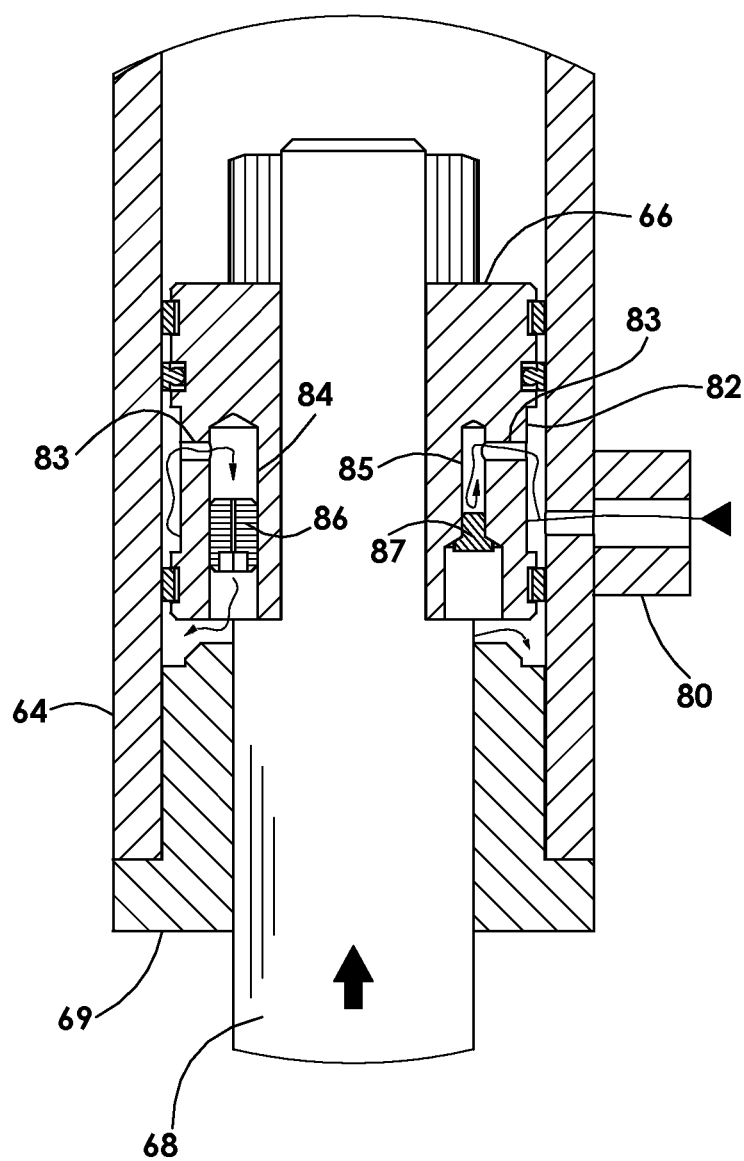
FIG. 6 is a schematic enlarged view of a portion of one of the primary actuators shown in FIG. 5 illustrating details of the piston of the primary actuator and flow of fluid with respect to the piston as the primary actuator moves from the extended condition toward the retracted condition.

Considering first the operation of the actuators when the grapple is moved from the closed position to the open position, FIG. 5 depicts the extended conditions of the primary and secondary actuators when the grapple in the closed position. FIG. 6 depicts the initial flow of fluid into the primary actuator to move the primary actuator from the extended condition toward the retracted condition, and FIG. 7 depicts the initial flow of fluid into the secondary actuator to move the secondary actuator from the extended condition toward the retracted condition.

Figure 7:
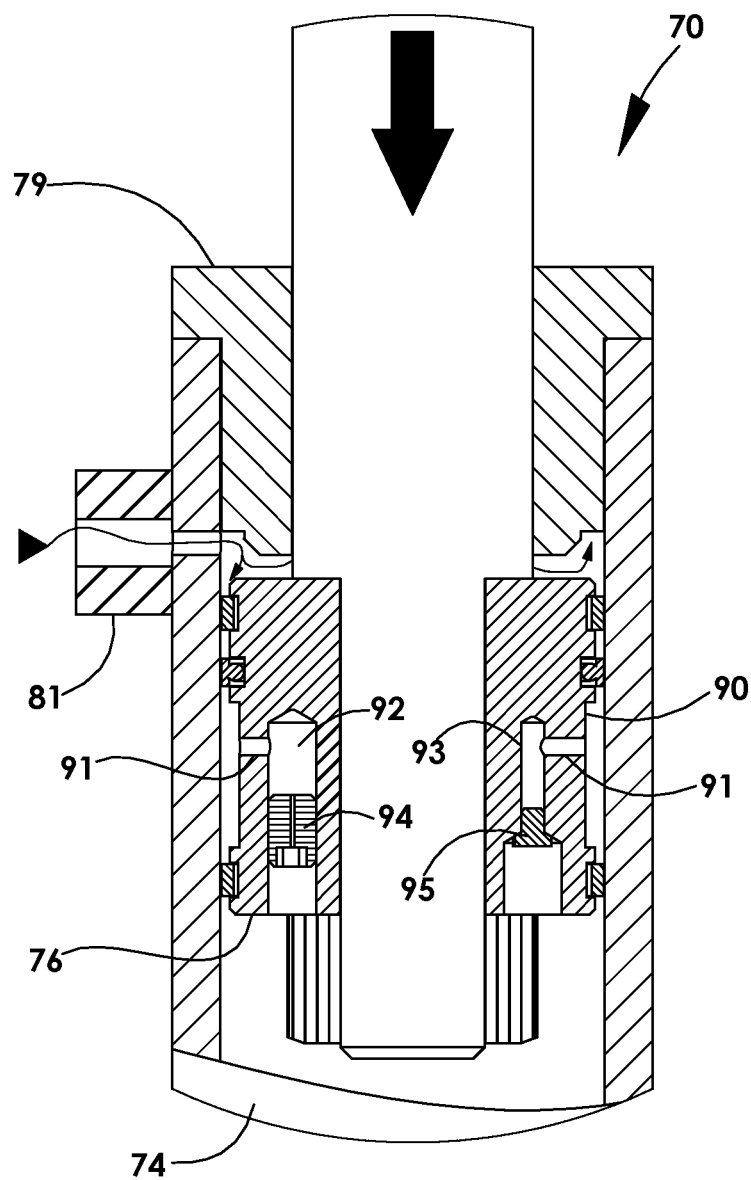
FIG. 7 is a schematic enlarged view of a portion of one of the secondary actuators shown in FIG. 5 illustrating details of the piston of the secondary actuator and flow of fluid with respect to the piston as the secondary actuator moves from the extended condition toward the retracted condition.
Figure 8:
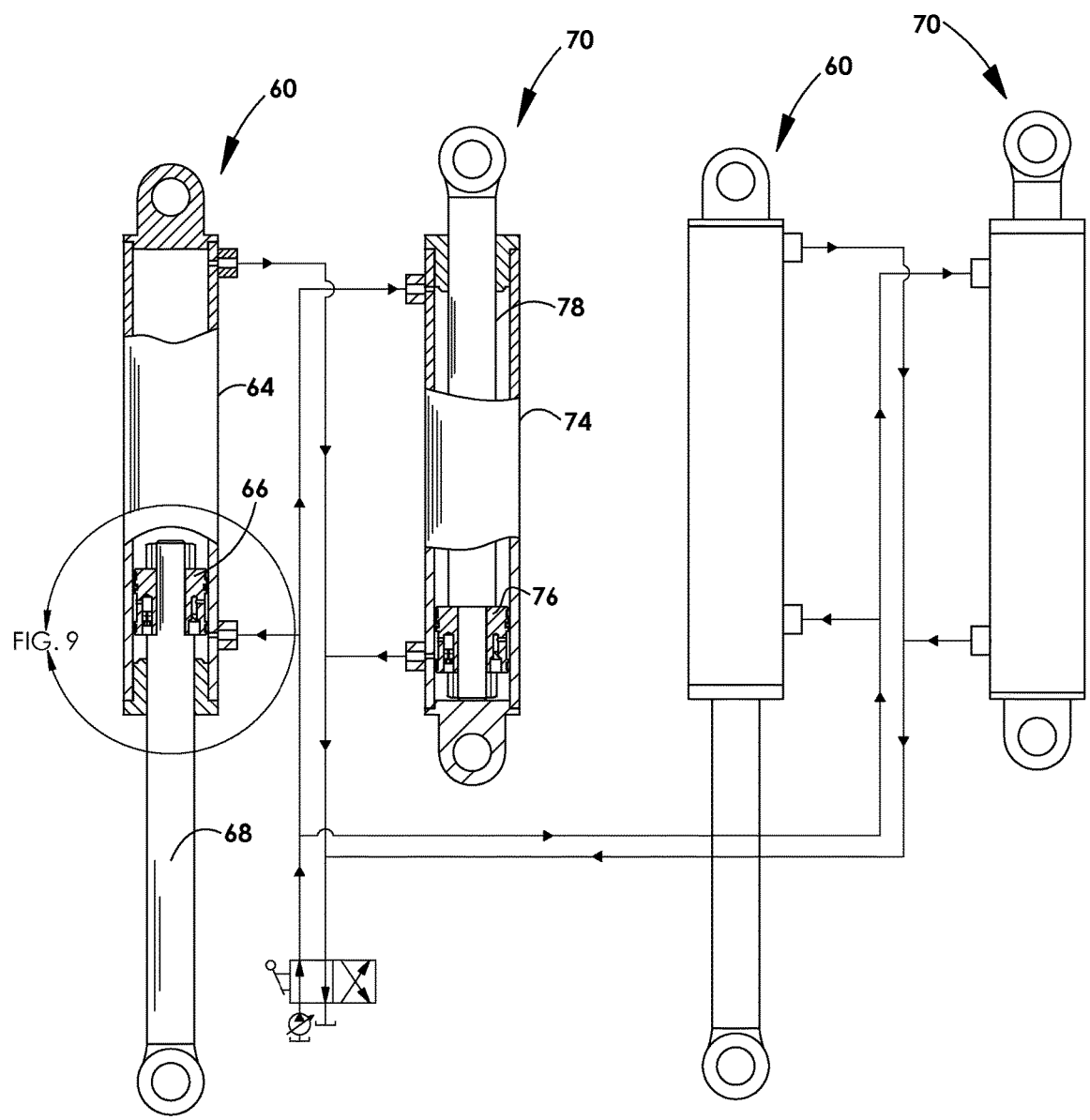
FIG. 8 is a hydraulic schematic showing a pair of the primary actuators and a pair of the secondary actuators in conditions corresponding to an intermediate position of the grapple arms shown in FIG. 3 and moving toward the open position, with the secondary actuators in a substantially fully retracted condition and the primary actuators in a substantially fully extended condition with portions of the actuators removed to reveal detail.

With respect to the initial movement of the secondary actuator 70 from the extended condition toward the retracted condition, as illustrated in FIG. 7, as fluid flow enters a fluid port 81 in the cylinder 74, structures of the actuator 70 may present no significant restrictions on fluid flow to cause movement of the piston 76 away from the rod end 79, and the piston may thus relatively quickly move away from the rod end, thus retracting the secondary actuator and relatively quickly opening the distal arm portion 40 of the grapple arm. Such movement is represented by the movement of the distal arm portion from position "A" to position "B" in FIG. 3, primarily including movement of the distal arm portion by the secondary actuator 70 with only a small degree of movement of the proximal arm portion 20 of the grapple arm by the primary actuator 60, due to the operation described below.

Figure 9:
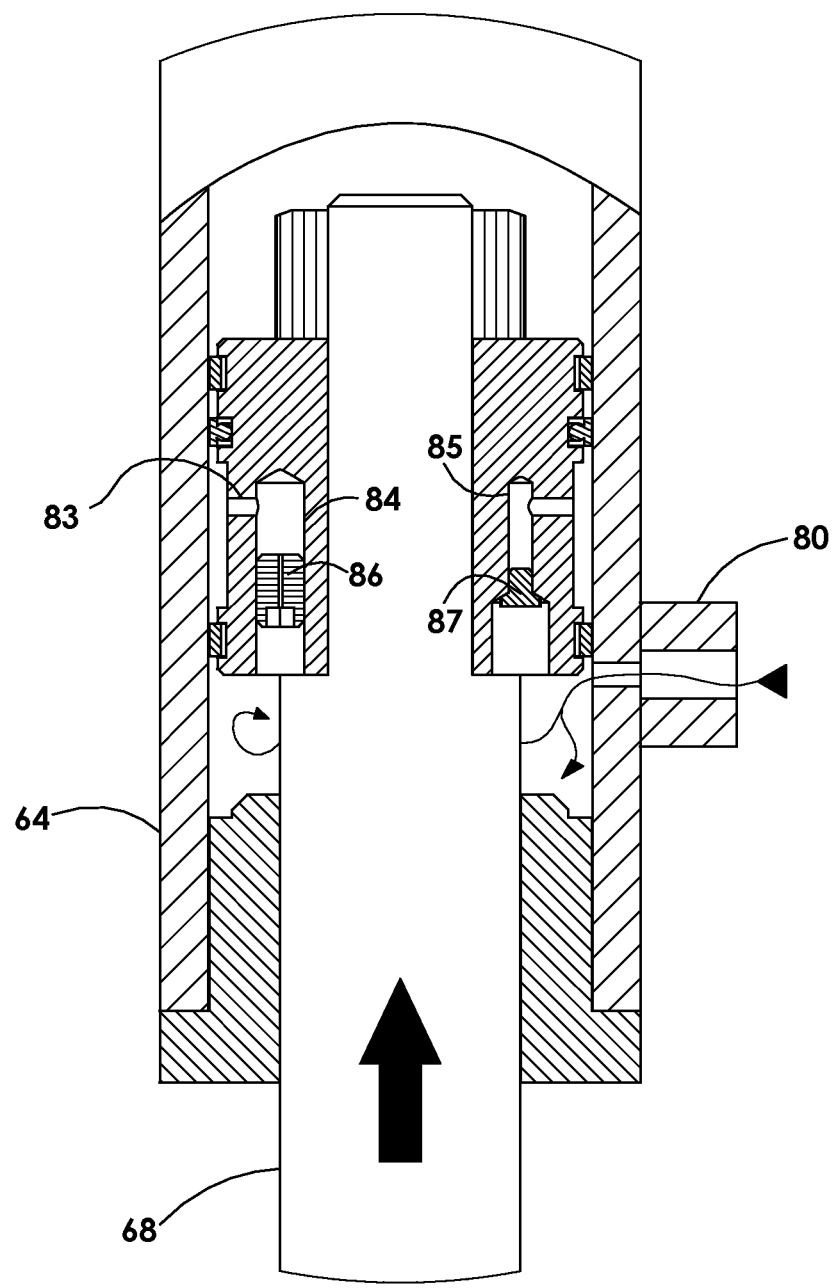
FIG. 9 is a schematic enlarged view of a portion of one of the primary actuators shown in FIG. 8 and illustrating details of the piston of the primary actuator and flow of fluid with respect to the piston as the primary actuator has just moved from the extended condition toward the retracted condition as the grapple arm is in the intermediate position.

With respect to the initial movement of the primary actuator from the extended condition toward the retracted condition, as illustrated in FIG. 6, as fluid flow enters the primary cylinder 64 through a fluid port 80, the sole path available for the fluid to reach the space between the primary piston 66 and the primary rod end 69 of the cylinder 64 is for the fluid to move through the port and into a primary relief 82 or void formed in the perimeter surface of the primary piston 66. The fluid can then flow through passages 83 into chambers 84, 85 in the piston 66. One chamber 84 is in communication with a restricted passage 86 and the other chamber 85 is in communication with a check valve 87, and fluid must flow through the restricted passage 86 and/or the check valve 87 to reach the space between the piston 66 and the rod end 69 of the cylinder 64. As fluid flow in this direction through the check valve 87 is checked or blocked, the fluid is forced flow thru the restricted passage 86 producing a relatively slow initial rate of movement by the piston 66 away from the rod end 69, and producing the delay in movement relative to the movement of the secondary actuator. Once the piston 66 moves a sufficient distance away from the rod end 69 so that fluid through the fluid port 80 is able to more directly flow to the space between the piston 66 and the rod end 69 directly (such as is depicted in FIG. 9) and the piston is able to move at a faster, full speed permitted by the fluid flow. Once the initial movement phase has completed and the time delay induced by the structure has elapsed, the primary actuator extends and the proximal arm portion rotates to the full open position of the grapple. Such movement is represented by the rotation of the proximal arm portion from position "B" to position "C" in FIG. 3.

Figure 10:
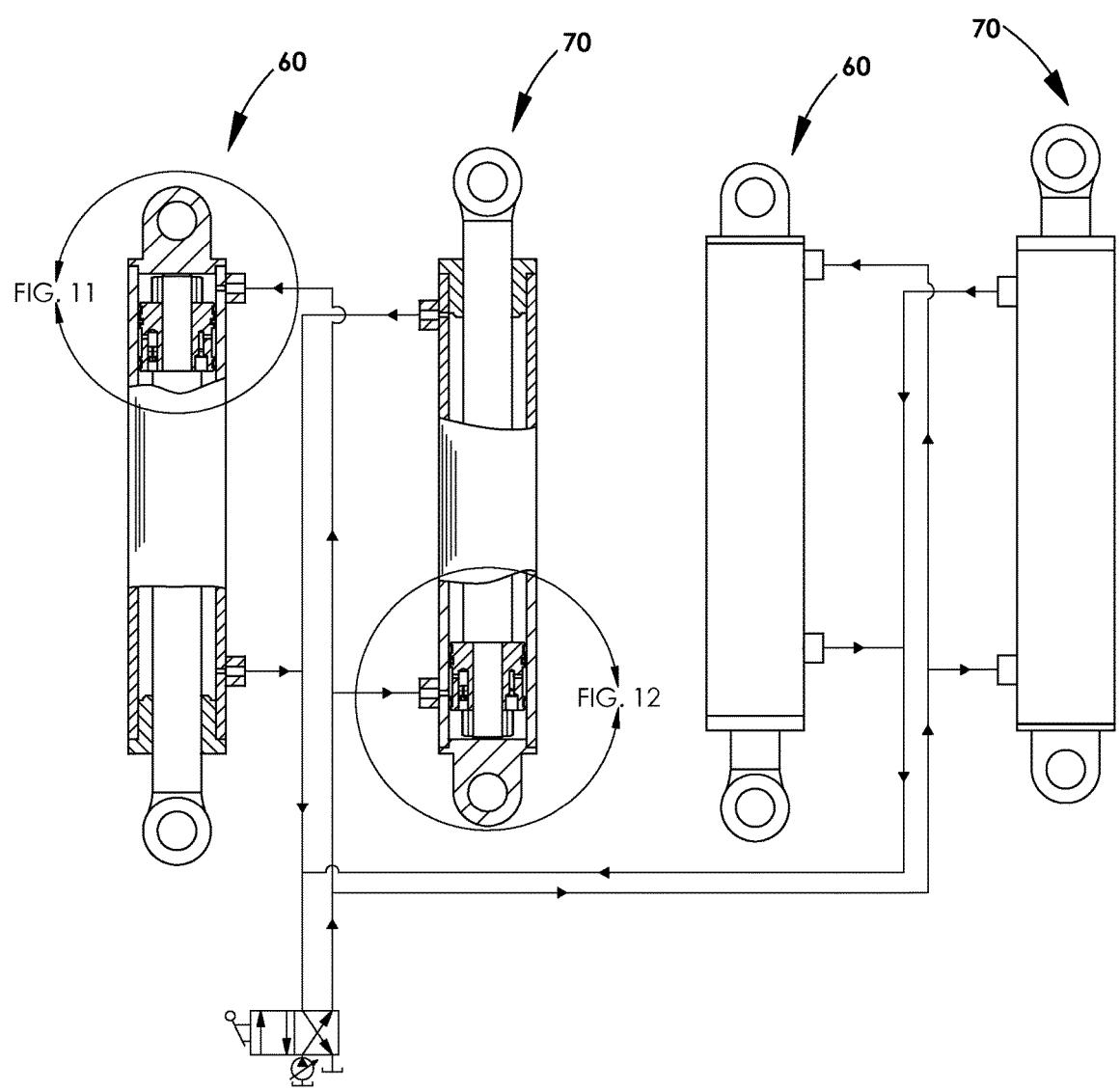
FIG. 10 is a hydraulic schematic showing a pair of the primary actuators and a pair of the secondary actuators in conditions corresponding to an open position of the grapple arms shown in FIGS. 3 and 4, with the primary and secondary actuators in substantially fully retracted conditions and moving toward the extended conditions, with portions of the actuators removed to reveal detail.
Figure 11:
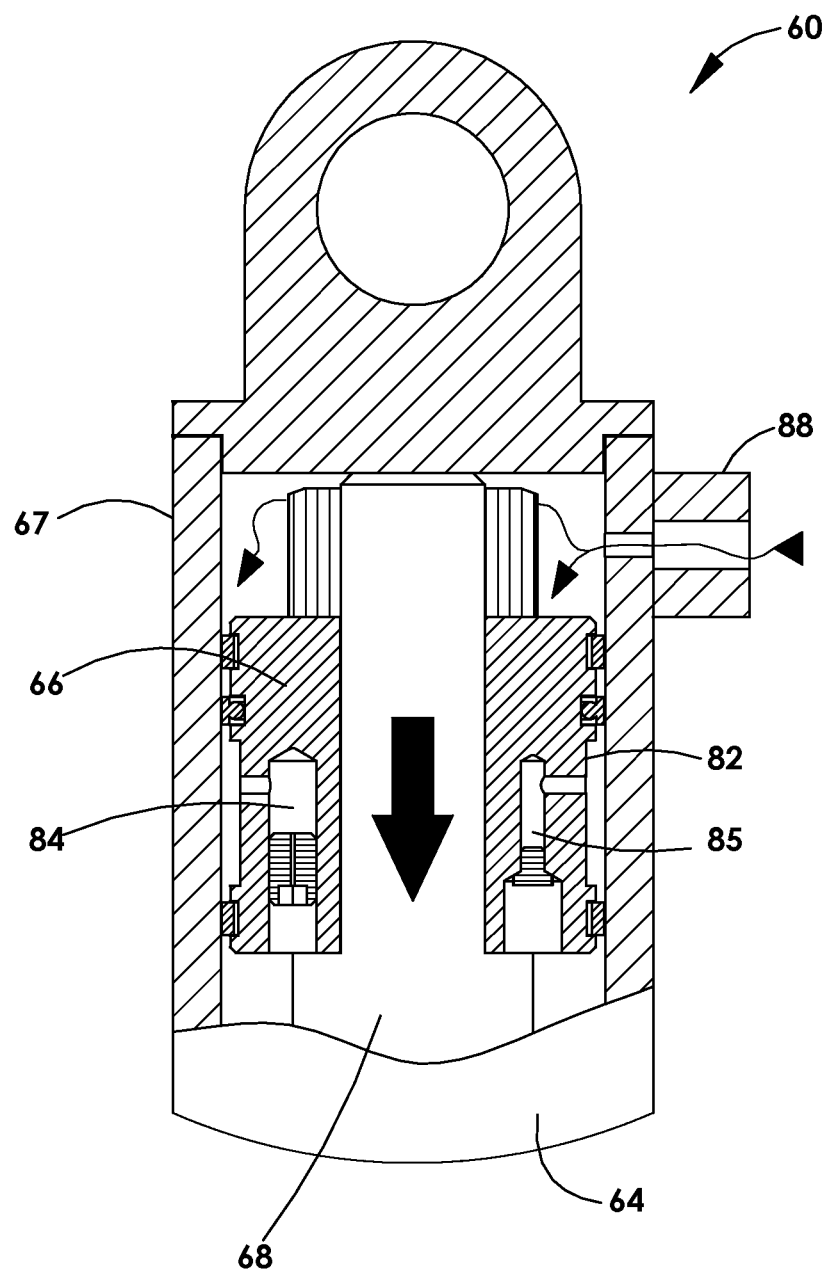
FIG. 11 is a schematic enlarged view of a portion of one of the primary actuators shown in FIG. 10 and illustrating details of the piston of the primary actuator and flow of fluid with respect to the piston as the primary actuator moves from the retracted condition toward the extended condition.
Figure 12:
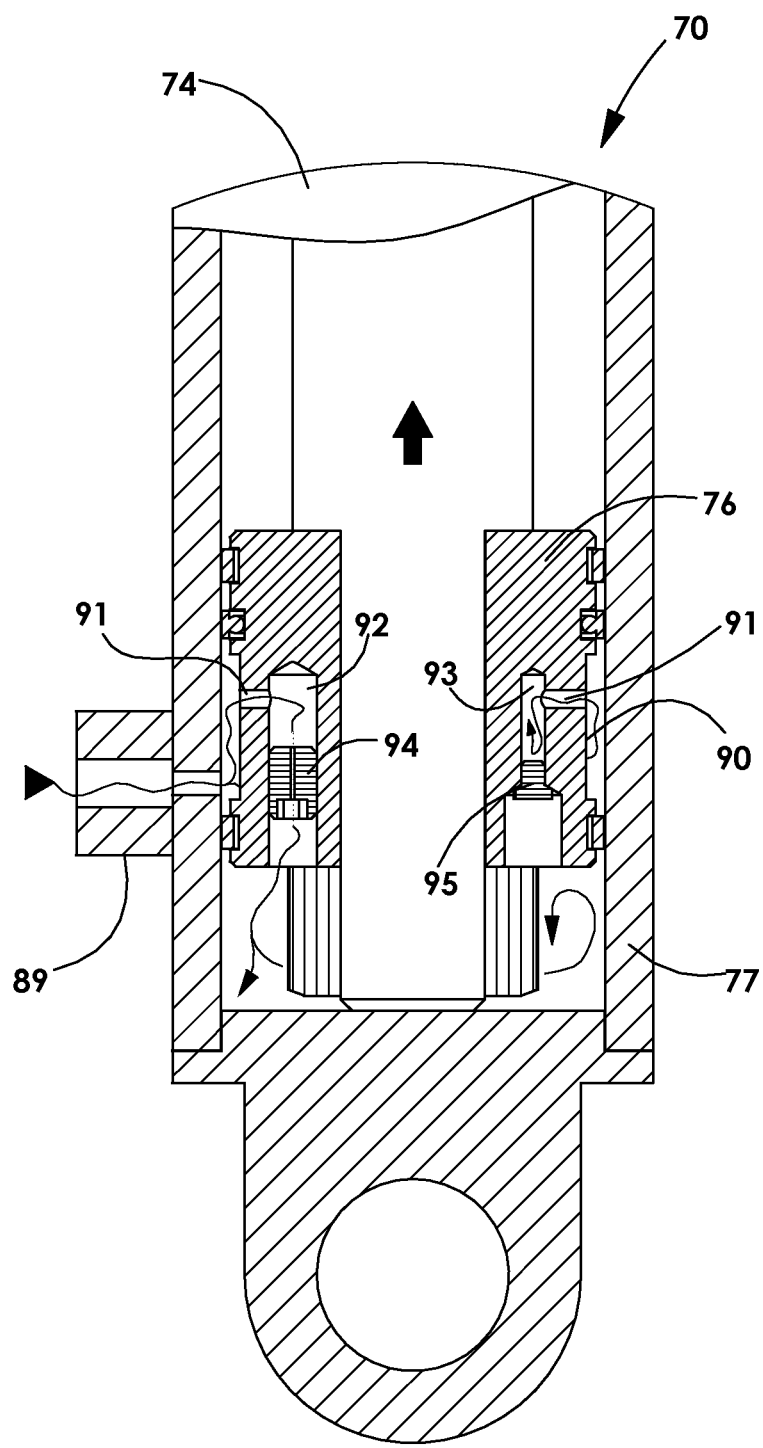
FIG. 12 is a schematic enlarged view of a portion of one of the secondary actuators shown in FIG. 10 and illustrating details of the piston of the secondary actuator and flow of fluid with respect to the piston as the secondary actuator moves from the retracted condition toward the extended condition.

Considering now the operation of the actuators when the grapple is moved from the open position to the closed position, the closing sequence of the grapple may be substantially a reversal of the opening sequence. In some embodiments, the secondary actuator may be configured such than an initial rate of movement of the secondary actuator from the retracted condition toward the extended condition is slower than the initial rate of movement of the primary actuator from the retracted condition toward the extended condition to produce substantially complete movement of the proximal arm portion of at least one grapple arm toward the closed position before movement of the distal arm portion toward the closed position is initiated. Extension of the primary actuator may be substantially completed while extension of the secondary actuator is delayed. FIG. 10 depicts the retracted conditions of the primary and secondary actuators when the grapple in in the open position. FIG. 11 depicts the initial flow of fluid into the primary actuator to move the primary actuator from the retracted condition toward the extended condition, and FIG. 12 depicts the initial flow of fluid into the secondary actuator to move the secondary actuator from the retracted condition toward the extended condition.

With respect to the initial movement of the primary actuator 60 from the retracted condition toward the extended condition (see FIG. 11), the fluid entering the primary cylinder 64 coming through the mount end fluid port 88 has virtually unobstructed movement into the space between the primary piston 66 and the primary mount end 67 of the cylinder 64 to push the piston 66 and rod 68 away from the mount end 67, thus extending the actuator toward a full extended length and effectively completing the first phase of the closing sequence. Such movement is represented by the movement of the proximal arm portion 20 from position "C" to position "D" in FIG. 4, primarily including movement of the proximal arm portion 20 by the primary actuator 60 with only a small degree of movement of the distal arm portion 40 of the grapple arm by the secondary actuator 70, due to the operation described below.

With respect to the initial movement of the secondary actuator 70 from the retracted condition toward the extended condition (see FIG. 12), operation is similar to the operation when the primary actuator initially moves from the extended condition toward the retracted condition during the grapple opening sequence. For the secondary actuator to extend fluid has to pressurize the space between the secondary piston 76 and the secondary mount end 77 of the secondary cylinder 74. The sole path available for the fluid to reach the space from the mount end port 89 is to move through the port and into a secondary relief 90 or void formed in the perimeter surface of the secondary piston 76. The fluid can then flow through passages 91 into chambers 92, 93 in the piston 76. One chamber 92 is in communication with a restricted passage 94 and the other chamber 93 is in communication with a check valve 95, and fluid must flow through the restricted passage 94 and/or the check valve 95 to reach the space between the piston 76 and the secondary mount end 77 of the cylinder 74. As fluid flow in this direction through the check valve 95 is checked or blocked, the fluid is forced flow through the restricted passage 94 producing a relatively slow initial rate of movement by the piston 76 away from the secondary mount end 77, and producing the delay in movement relative to the movement of the primary actuator. Once the piston 76 moves a sufficient distance away from the mount end 77 so that fluid through the fluid port 89 is able to more directly flow to the space between the piston 76 and the mount end 77 directly (see FIGS. 15 and 16) and the piston is able to move at a faster, full speed permitted by the fluid flow. Once the initial movement phase has completed and the time delay induced by the structure has elapsed, the secondary actuator extends and the distal arm portion rotates to the full closed position of the grapple. Such movement is represented by the rotation of the proximal arm portion from position "D" to position "A" in FIG. 4.

Figure 13:
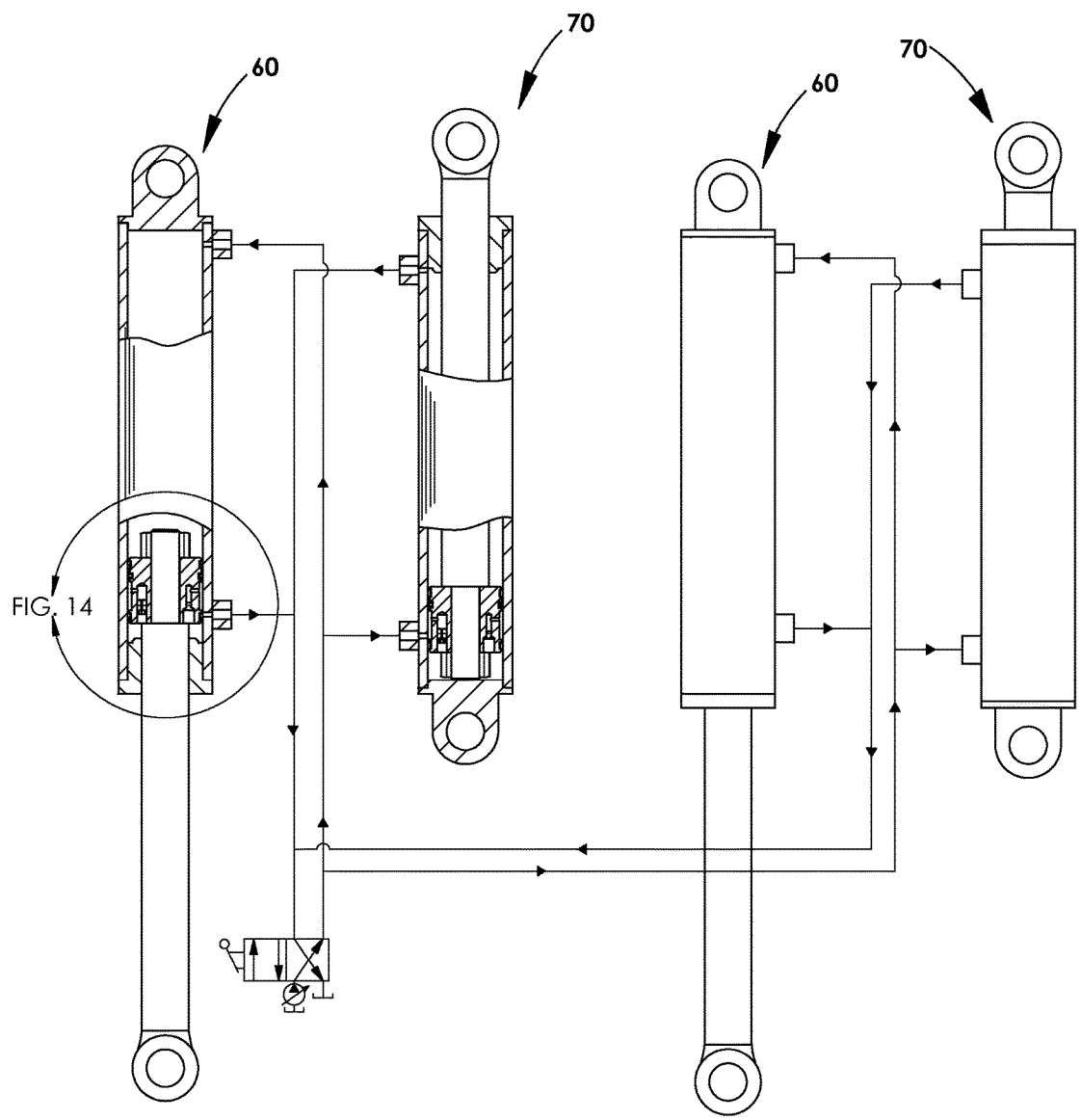
FIG. 13 is a hydraulic schematic showing a pair of the primary actuators and a pair of the secondary actuators in conditions corresponding to an intermediate position of the grapple arms shown in FIG. 4 and moving toward the closed position, with the secondary actuators in a substantially fully retracted condition and the primary actuators approaching a substantially fully extended condition, with portions of the actuators removed to reveal detail.
Figure 14:
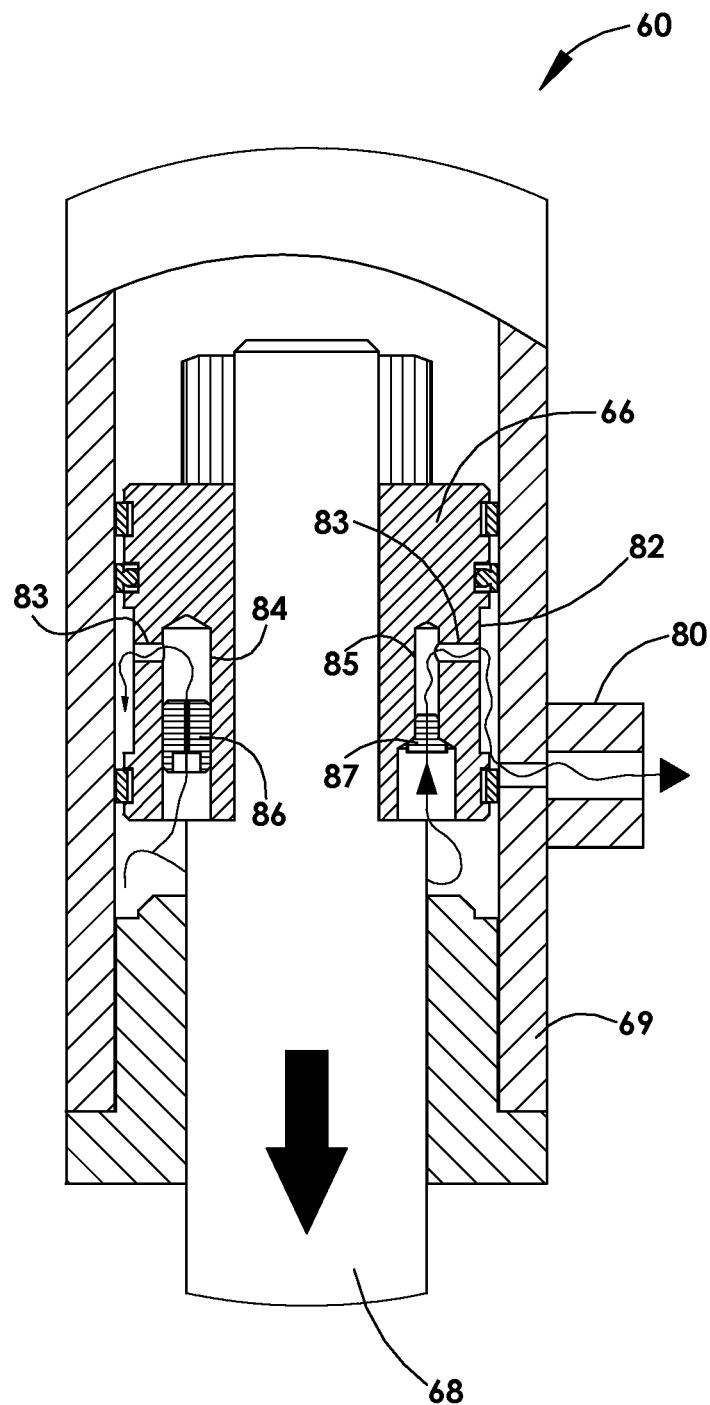
FIG. 14 is a schematic enlarged view of a portion of one of the primary actuators shown in FIG. 13 and illustrating details of the piston of the primary actuator and flow of fluid with respect to the piston as the primary actuator approaches the fully extended position.
Figure 15:
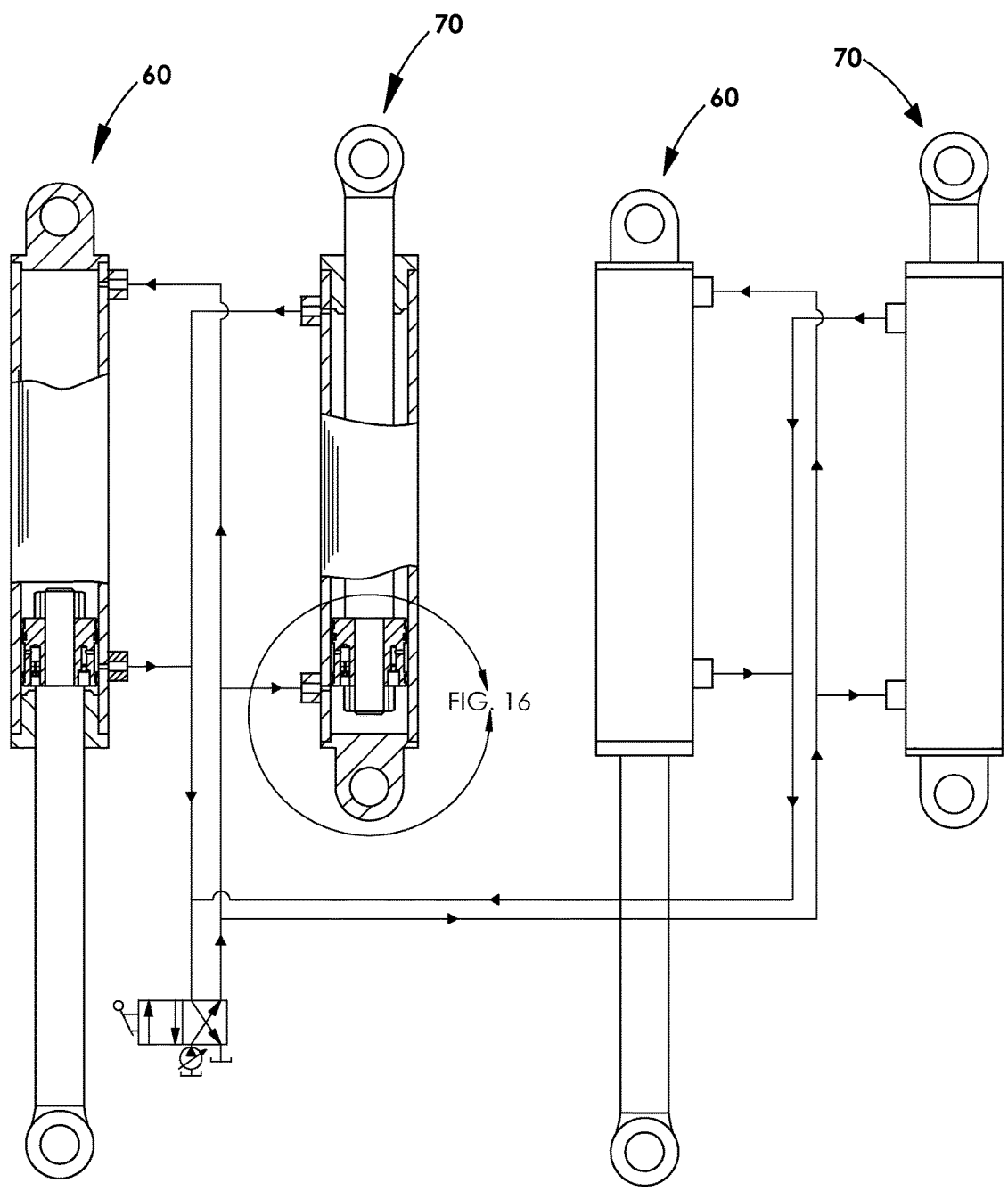
FIG. 15 is a hydraulic schematic showing a pair of the primary actuators and a pair of the secondary actuators in conditions corresponding to an intermediate position of the grapple arms shown in FIG. 4 and moving toward the closed position, with the primary actuators in a substantially fully extended condition and the secondary actuators having just moved from the fully retracted condition, with portions of the actuators removed to reveal detail.
Figure 16:
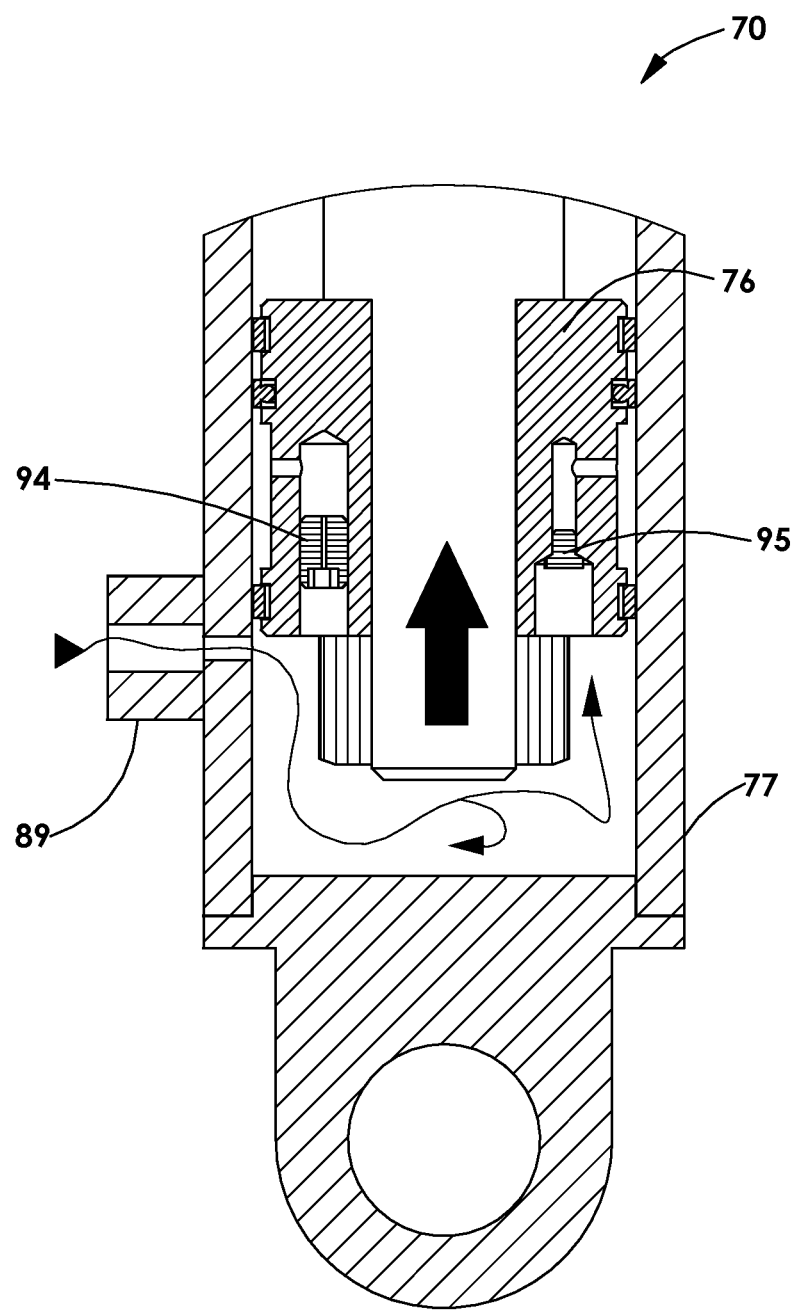
FIG. 16 is a schematic enlarged view of a portion of one of the secondary actuators shown in FIG. 15 and illustrating details of the piston of the secondary actuator and flow of fluid with respect to the piston as the secondary actuator has moved initially from the retracted condition toward the extended condition.
Figure 17A:
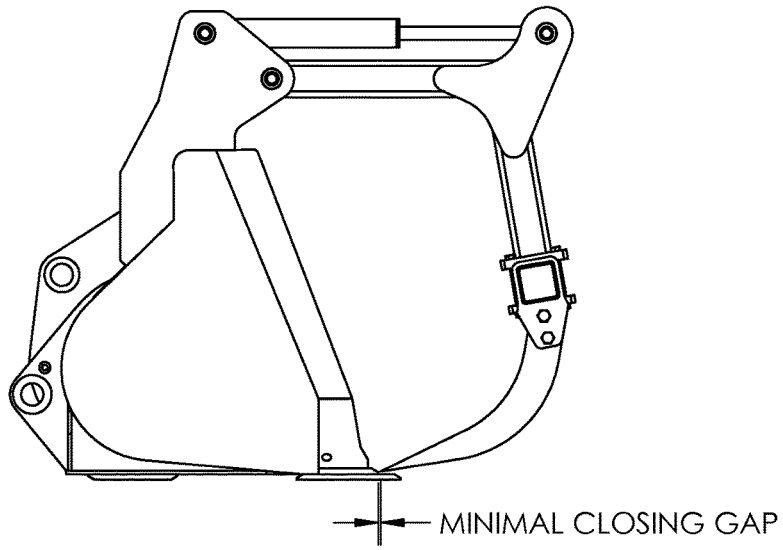
FIGS. 17A and 17B are schematic views of one prior art grapple design shown in closed and open positions.
Figure 17B:
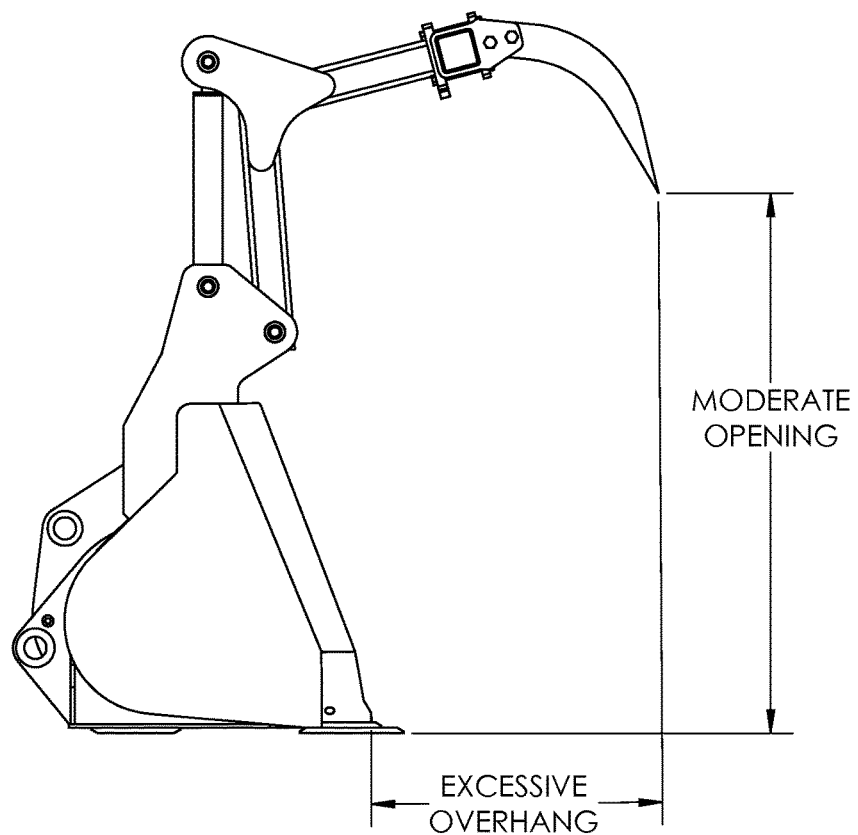
Figure 17C:
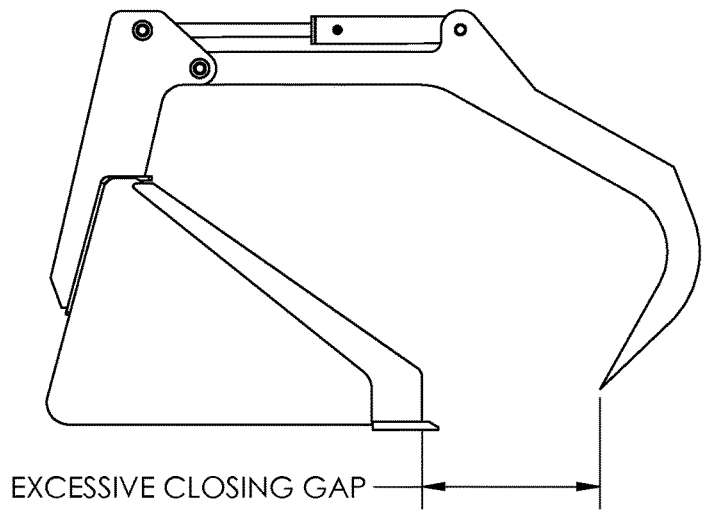
FIGS. 17C and 17D are schematic views of another prior art grapple design shown in open and closed positions.
Figure 17D:
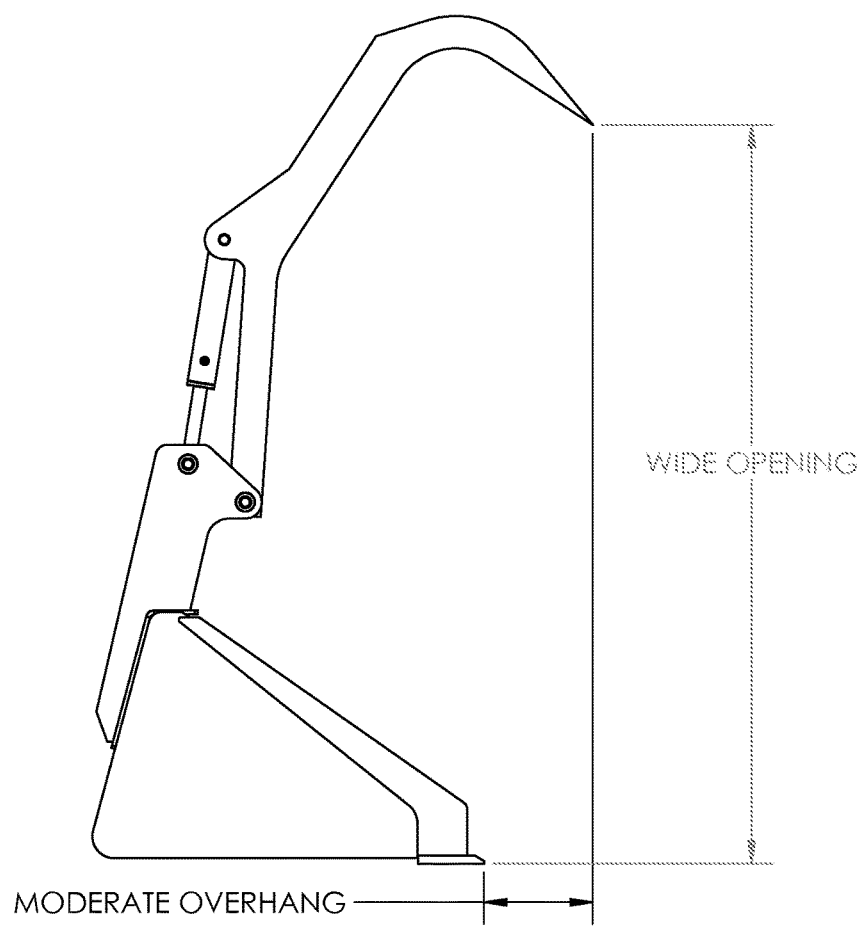
Figure 18:
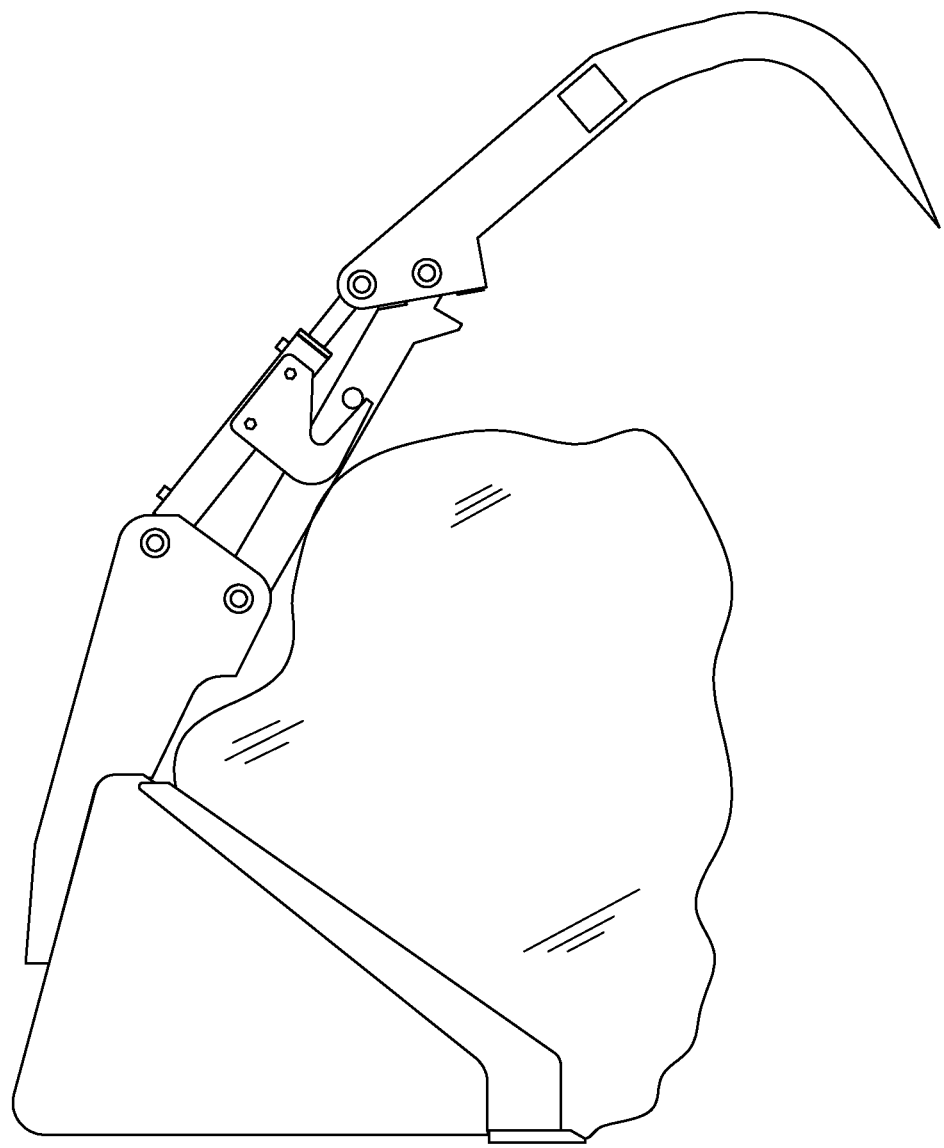
FIG. 18 is a schematic side view of another prior art grapple design shown in an open position.

The operation of the primary actuator 60 when the grapple is closing and the actuator 60 is extending, and more specifically when the actuator 60 is operating toward the end of the stroke and approaches the fully extended condition, is schematically illustrated in FIG. 13. As the primary piston 66 is approaching the cylinder rod end 69, the piston 66 may begin to move by the location of the rod end fluid port 80 (see FIG. 14). The most direct path for fluid to escape from the (shrinking) space between the piston 66 and the rod end 69 through the rod end port 80 is being blocked by the presence of the piston 66. For the fluid to continue to exit the space under the pressure of the advancing piston 66, the fluid must reach the primary relief 82 in the primary piston 66 through the chambers 84, 85 and the passages 83 of the piston 66. The configuration of the check valve 87 is such that flow through the valve 87 is not blocked in this direction of movement to the chamber 85, and the fluid may also move through the restricted passage 86 to the chamber 84. The ability of the fluid to flow through the check valve 87 tends to minimize the restriction encountered by the fluid to movement, and therefore also minimizes any time delay in the final movement of the piston toward the end of the cylinder. The operation of the secondary actuator 70 when the grapple is opening and the actuator is retracting, and more specifically when the secondary actuator 70 is operating toward the end of the stroke and approaches the fully retracted condition, may be similar to the operation described above in that the presence of the check valve 95 permits freer fluid flow through the secondary piston 76 as the piston 76 moves by the mount end fluid port 89 and toward the first end of the secondary actuator 72.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A grapple apparatus for an implement, the apparatus comprising:
   at least one grapple arm movable between an open position and a closed position, the at least one grapple arm comprising a proximal arm portion for movably mounting on the implement and a distal arm portion movably mounted on the proximal arm portion;
   a plurality of grapple teeth being mounted on the at least one grapple arm;
   a primary actuator connected to the proximal arm portion to move the proximal arm portion, the primary actuator being extendable into an extended condition to move the proximal arm portion of the at least one grapple arm toward the closed position and being retractable into a retracted condition to move the proximal arm portion toward the open position;
   a secondary actuator connected to the distal arm portion to move the distal arm portion, the secondary actuator being extendable into an extended condition to move the distal arm portion of the at least one grapple arm toward the closed position and being retractable into a retracted condition to move the distal arm portion toward the open position;
   wherein the primary actuator is configured such that an initial rate of movement of the primary actuator from the extended condition toward the retracted condition is slower than an initial rate of movement of the secondary actuator from the extended condition toward the retracted condition to produce substantially complete movement of the distal arm portion of the at least one grapple arm toward the open position before movement of the proximal arm portion toward the open position is initiated.

2. The apparatus of claim 1 wherein the primary actuator is configured such that an initial rate of movement of the primary actuator from the extended condition toward the retracted condition is slower than an intermediate rate of movement of the primary actuator toward the retracted condition.

3. The apparatus of claim 2 wherein a final rate of movement of the primary actuator toward the retracted condition is slower than the intermediate rate of movement.

4. The apparatus of claim 1 wherein the secondary actuator is configured such that an initial rate of movement of the secondary actuator moving toward the retracted condition is substantially equal to an intermediate rate of movement of the secondary actuator toward the retracted condition.

5. The apparatus of claim 1 wherein the primary actuator is configured such that an initial rate of movement of the primary actuator from the retracted condition toward the extended condition is substantially equal to an intermediate rate of movement of the primary actuator toward the extended condition.

6. The apparatus of claim 5 wherein the primary actuator is configured such that a final rate of movement of the primary actuator toward the extended condition is slower than the intermediate rate of movement.

7. The apparatus of claim 1 wherein the secondary actuator is configured such that an initial rate of movement of the secondary actuator from the retracted condition toward the extended condition is slower than an initial rate of movement of the primary actuator from the retracted condition toward the extended condition to produce substantially complete movement of the proximal arm portion of the at least one grapple arm toward the closed position before movement of the distal arm portion toward the closed position is initiated.

8. The apparatus of claim 1 wherein the secondary actuator is configured such that an initial rate of movement of the secondary actuator from the retracted condition toward the extended condition is slower than an intermediate rate of movement of the secondary actuator toward the extended condition.

9. The apparatus of claim 8 wherein the primary actuator is configured such that a final rate of movement of the primary actuator toward the extended condition is slower than the intermediate rate of movement and faster than the initial rate of movement.

10. The apparatus of claim 1 wherein the distal arm portion is pivotally mounted on the proximal arm portion and the plurality of grapple teeth are mounted on the distal arm portion.

11. The apparatus of claim 1 wherein the at least one grapple arm comprises a pair of grapple arms, each of the grapple arms having a said proximal arm portion and a said distal arm portion.

12. A grapple apparatus for an implement, the apparatus comprising:
at least one grapple arm movable between an open position and a closed position, the at least one grapple arm comprising a proximal arm portion for movably mounting on the implement and a distal arm portion movably mounted on the proximal arm portion;
a plurality of grapple teeth being mounted on the at least one grapple arm;
a primary actuator connected to the proximal arm portion to move the proximal arm portion, the primary actuator being extendable into an extended condition to move the proximal arm portion of the at least one grapple arm toward the closed position and being retractable into a retracted condition to move the proximal arm portion toward the open position;
a secondary actuator connected to the distal arm portion to move the distal arm portion, the secondary actuator being extendable into an extended condition to move the distal arm portion of the at least one grapple arm toward the closed position and being retractable into a retracted condition to move the distal arm portion toward the open position;
wherein the primary actuator is configured such that an initial rate of movement of the primary actuator from the extended condition toward the retracted condition is slower than an intermediate rate of movement of the primary actuator toward the retracted condition.

13. The apparatus of claim 12 wherein a final rate of movement of the primary actuator toward the retracted condition is slower than the intermediate rate of movement.

14. The apparatus of claim 12 wherein the secondary actuator is configured such that an initial rate of movement of the secondary actuator moving toward the retracted condition is substantially equal to an intermediate rate of movement of the secondary actuator toward the retracted condition.

15. The apparatus of claim 12 wherein the primary actuator is configured such that an initial rate of movement of the primary actuator from the retracted condition toward the extended condition is substantially equal to an intermediate rate of movement of the primary actuator toward the extended condition.

16. The apparatus of claim 12 wherein the secondary actuator is configured such that an initial rate of movement of the secondary actuator from the retracted condition toward the extended condition is slower than an intermediate rate of movement of the secondary actuator toward the extended condition.

17. A loader system comprising:
a mobile frame;
at least one lift arm pivotable with respect to the mobile frame by at least one actuator;
an implement mounted on the at least one lift arm;
a grapple mount structure mounted on the implement;
a grapple apparatus comprising:
at least one grapple arm movable between an open position and a closed position, the at least one grapple arm comprising a proximal arm portion movably mounted on the implement and a distal arm portion movably mounted on the proximal arm portion;
a plurality of grapple teeth being mounted on the at least one grapple arm;
a primary actuator connected to the proximal arm portion to move the proximal arm portion, the primary actuator being extendable into an extended condition to move the proximal arm portion of the at least one grapple arm toward the closed position and being retractable into a retracted condition to move the proximal arm portion toward the open position;
a secondary actuator connected to the distal arm portion to move the distal arm portion, the secondary actuator being extendable into an extended condition to move the distal arm portion of the at least one grapple arm toward the closed position and being retractable into a retracted condition to move the distal arm portion toward the open position;
wherein the primary actuator is configured such that an initial rate of movement of the primary actuator from the extended condition toward the retracted condition is slower than an initial rate of movement of the secondary actuator from the extended condition toward the retracted condition to produce substantially complete movement of the distal arm portion of the at least one grapple arm toward the open position before movement of the proximal arm portion toward the open position is initiated.

18. The system of claim 17 wherein the primary actuator is configured such that an initial rate of movement of the primary actuator from the extended condition toward the retracted condition is slower than an intermediate rate of movement of the primary actuator toward the retracted condition.

19. The system of claim 18 wherein the secondary actuator is configured such that an initial rate of movement of the secondary actuator moving toward the retracted condition is substantially equal to an intermediate rate of movement of the secondary actuator toward the retracted condition.

* * * * *